United States Patent
Sasaki et al.

(10) Patent No.: US 6,480,234 B1
(45) Date of Patent: Nov. 12, 2002

(54) METHOD AND APPARATUS FOR SYNCHRONOUSLY ENCODING AUDIO SIGNALS WITH CORRESPONDING VIDEO FRAMES

(75) Inventors: Masao Sasaki, Kanagawa (JP); Masahito Mori, Kanagawa (JP); Satoshi Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/979,634

(22) Filed: Nov. 28, 1997

Related U.S. Application Data

(63) Continuation of application No. PCT/JP96/01490, filed on May 31, 1996.

(30) Foreign Application Priority Data

May 31, 1995 (JP) ............................................. 7-158617

(51) Int. Cl.[7] ............................................. H04N 9/475
(52) U.S. Cl. .................. 348/512; 348/513; 375/240.24; 375/240.26
(58) Field of Search ................................. 348/512, 513, 348/515, 423.1, 484, 714; 382/54, 96, 100; 375/240.24, 240.26

(56) References Cited

U.S. PATENT DOCUMENTS

| | | | | |
|---|---|---|---|---|
| 4,851,409 A | * | 7/1989 | Noske et al. | 358/149 |
| 5,351,090 A | * | 9/1994 | Nakamura | 348/484 |
| 5,351,092 A | * | 9/1994 | Poimboeuf et al. | 348/512 |
| 5,483,538 A | * | 1/1996 | Rainbolt | 370/100.1 |
| 5,594,550 A | * | 1/1997 | Juri et al. | 386/40 |

FOREIGN PATENT DOCUMENTS

| | | |
|---|---|---|
| EP | 0 644 692 | 3/1995 |
| EP | 0 648 050 | 4/1995 |
| JP | 60-212874 | 10/1985 |
| JP | 61-73207 | 4/1986 |
| JP | 62-219205 | 9/1987 |
| JP | 1-119127 | 5/1989 |

\* cited by examiner

Primary Examiner—Victor R. Kostak
(74) Attorney, Agent, or Firm—Frommer Lawrence & Haug LLP; William S. Frommer; Darren M. Simon

(57) ABSTRACT

This invention enables coded audio data to be reliably decoded even if an audio signal coded in blocks not in synchronism with the frames or fields of a video signal is decoded on the basis of these frames of fields. By filling an integral number of coded audio blocks in the period of time corresponding to one frame or field of the video signal, this invention forms an array of coded audio blocks in synchronism with the frames or fields of the video signal before transmission. This avoids separating a coded block in transmitted data at a frame or field boundary, and enables the coded audio data to be reliably decoded so as to prevent the occurrence of a period of time in which decoded data is missing even if a switching operation is carried out on the basis of the frames or fields of the video signal.

13 Claims, 7 Drawing Sheets

METHOD AND APPARATUS FOR SYNCHRONOUSLY ENCODING AUDIO SIGNALS WITH CORRESPONDING VIDEO FRAMES

This is a continuation of PCT/JP96/01490 filed May 31, 1996.

TECHNICAL FIELD

This invention relates to a method and apparatus for coding audio signals and a method and apparatus for decoding coded audio signals, and is preferably applicable to, for example, recording and reproducing apparatuses that code audio signals in blocks to transmit, record, and reproduce them with video signals.

BACKGROUND ART

Conventional methods for coding audio signals in blocks to reduce the amount of data include sub-band coding and conversion coding. For example, the audio coding method called ATRAC (Adaptive Transform Acoustic Coding) used for minidiscs (MD) and the coding method called PASC (Precision Adaptive Sub-band Coding) used for digital compact cassettes (DCC) code DCT (Discrete Cosine Transform) coefficients or band-divided data.

In this manner, conventional audio coding methods use quasi-instantaneous compounding, which is used in the sound standard of MPEG (Moving Pictures Expert Group). Since the level of audio signals varies at a relatively low speed, the quasi-instantaneous compounding divides the signal into blocks each including a specified number of samples and compresses and extends the data on the basis of the blocks.

Video signals, which carry images that have one-to-one correspondence with sounds carried by audio signals, are edited on the basis of frames or fields, but in the audio coding method that uses blocks as the coding unit, the length of coded blocks is determined independently of the number of samples per video signal frame or field.

Thus, when a coded audio signal is transmitted, recorded, or reproduced with a coded video signal, temporal information is added to the video and audio signals to be transmitted to enable decoding synchronization between them, and on reception or reproduction, a system controller in a receiver or a reproducing device decodes these signals based on the temporal information added to the transmitted data.

In this case, however, when an attempt is made to decode the audio signal in synchronism with the video signal, there occurs a period of time when the audio signal cannot be decoded. For example, when an audio signal sampled at 48 [kHz] is coded on the basis of MPEG layer I, which is the MPEG's sound standard, the signal is converted into an array of blocks each having a length equal to 384 samples. On the other hand, in a 525/59.94 video system (a video system using 525 scanning lines and a field frequency of 59.94 [Hz]), the number of samples included in audio data corresponding to one video frame is 1601 or 1602 if the audio signal is sampled at 48 [kHz].

As a result, when an attempt is made to simultaneously decode the coded video and audio signals, coded audio blocks each extending across two video frames in the video signal result. Thus, if the coded audio signal is decoded after switching on the basis of the frames or fields of the video signal as in editing, decoded data may be missing in coded blocks. before or after the switching point. In the worst case, if a first audio signal having data of 383 samples before a video frame boundary and data of one sample after the boundary is connected to a second audio signal having data of one sample before a video frame boundary and data of 383 samples after the boundary, the audio signal cannot be decoded during the period of time corresponding to the sum of the 383-sample data in the first audio signal and the 383-sample data in the second audio signal (that is, data of the 766 samples) and the period of time corresponding to data of 256 samples before or after the first period of time (data of the 512 samples in total) due to sub-band coding.

DISCLOSURE OF THE INVENTION

This invention proposes a method and apparatus for coding audio signals and a method and apparatus for decoding coded audio signals which involve no period of time in which decoded data is missing, thereby transmitting them even if an audio signal coded in blocks not in synchronism with the frames or fields of a video signal is decoded on the basis of these frames or fields.

To solve the above problem, this invention provides an audio signal coding method for coding an input audio signal in specified data units to form coded audio data separated into coded blocks, wherein the audio signal is block coded in such a way that an integral number of audio coded blocks are filled in the period of time corresponding to one frame or field of the video signal, thereby forming an array of coded blocks in synchronism with the frames or fields of the video signal.

The method according to this invention comprises the steps of blocking and coding an input audio signal in specified data units to form coded blocks separated into blocks, aligning the leading position of one of the coded blocks with a corresponding frame or field boundary in a video signal, and forming an array of coded blocks in synchronism with the frames or fields of the video signal by arranging those coded blocks which follow the coded block the leading position of which has been aligned with the corresponding frame or field boundary in the video signal in such a way that an integral number of coded blocks are filled in the period of time corresponding to one frame or field.

This invention also provides an audio signal encoder for coding an input audio signal in specified data units to form coded audio data separated into coded blocks, comprising a coding means for blocking and coding an input audio signal in specified data units to form coded blocks separated into blocks, a detection means for determining the phase difference between the frame or field boundaries in the video signal and the coded blocks to detect the coded block corresponding to a particular frame or field boundary based on the phase difference, and a memory means for inputting output from the coding means, aligning, based on the results of detection by the detection means, the leading position of the coded block with a corresponding frame or field boundary, and outputting coded blocks in synchronism with the frames or fields of the video signal by arranging those coded blocks which follow the coded block the leading position of which has been aligned with the corresponding frame or field boundary in such a way that an integral number of coded blocks are filled in the period of time corresponding to one frame or field.

The method according to this invention codes an input audio signal using the audio signal coding steps including the steps of blocking and coding an input audio signal in specified data units to form coded blocks separated into blocks, aligning the leading position of one of the coded blocks with a corresponding frame or field boundary in the video signal, forming coded audio data in synchronism with the frames or fields of the video signal by arranging those coded blocks which follow the coded block the leading position of which has been aligned with the corresponding frame or field boundary in the video signal in such a way that an integral number of coded blocks are filled in the period of time corresponding to one frame or field, and adding to the coded audio data, information representing the phase difference between the frame or field boundary in the video signal and the coded block not subjected to alignment of the leading position with the corresponding frame or field boundary, and decodes the coded audio data using coded audio data decoding steps including the steps of detecting relevant phase difference information from the coded audio data including the information on the phase difference and recovering the original phase relationship between the coded block and the video signal based on the detected phase difference information.

This invention includes an audio signal coding section comprising a coding means for blocking and coding an input audio signal in specified data units to form coded blocks separated into blocks, a detection means for determining the phase difference between the frame or field boundaries in the video signal and the coded blocks to detect the coded block corresponding to a particular frame or field boundary based on the phase difference, and a memory means for inputting output from the coding means, aligning, based on the results of detection by the detection means, the leading position of the coded block with a corresponding frame or field boundary, and outputting coded blocks in synchronism with the frames or fields by arranging those coded blocks which follow the coded block the leading position of which has been aligned with the corresponding frame or field boundary in such a way that an integral number of coded blocks are filled in the period of time corresponding to one frame or field, and a phase difference addition means for adding the phase difference detected by the detection means to the corresponding coded block output from the memory means in synchronism with the frames or fields; and a coded audio data decoding section comprising a phase difference information detection means for detecting phase difference information from the coded audio data formed by the audio signal coding section and a memory means for recovering the original phase relationship between the coded block and the video signal based on the detected phase difference information.

Since an integral number of coded blocks are filled in the period of time corresponding to one frame or field in the video signal in order to form an array of coded blocks in synchronism with the frames or fields of the video signal, the audio coded block is not separated at a switching point even if switching such as edition is carried out on the basis of the frames or fields of the video signal. Consequently, the decoding section can decode even coded audio data near the switching point, thereby reducing periods of time in which decoded data is missing.

Since the information on the phase difference between the video signal and the audio coded block detected by the detection means is added to the coded audio data, the decoding section can recover the original phase relationship between the audio coded block and the video signal based on the phase difference information.

Thus, according to this invention, an integral number of coded blocks are filled in the period of time corresponding to one frame or field of the video signal in order to form audio coded blocks in synchronism with each frame or field of the video signal, so most of the coded audio data can be decoded even if switching is executed on the basis of the frames or fields.

In addition, by adding the phase difference information that represents the phase difference between the original coded block and the video signal and which has been used for synchronization to the coded audio data comprising coded audio blocks in synchronism with the frames or fields of the video signal, the phase can be managed easily during decoding to enable the configuration of the decoder to be simplified.

BEST MODE FOR CARRYING OUT THE INVENTION

One embodiment of this invention is described below with reference to the drawings.
(1) First Embodiment In FIG. 1, 1 generally indicates an audio signal encoder that is provided in, for example, a sound signal recording section in a digital video tape recorder. Input audio signals $S_{AUD}$ sampled at a frequency of 48 [kHz] and block pulse signals $S_{BLK}$ each comprising a pulse signal that rises every 384 T of audio block length (T represents a sampling period of 20.8 [μsec] at a sampling frequency of 48 [kHz]) are input to an MPEG coding circuit 2.

The MPEG coding circuit 2 sub-band codes an input audio signal $S_{AUD}$ in blocks in synchronism with a block pulse signal $S_{BLK}$ based on the MPEG's sound standard MPEG layer I. This allows one sub-band coded block to be formed every 384 samples in input audio data, and coded data $S_{CODE1}$ obtained is supplied to a memory circuit 3.

Figure 2:
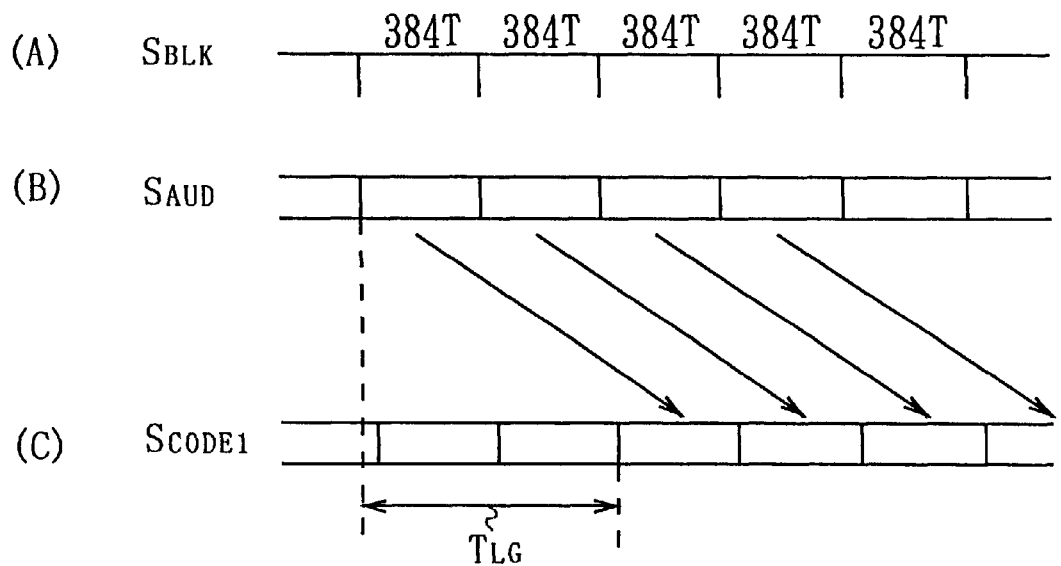
FIGS. 2(A) to (C) are schematic diagram explaining the input and output of an MPEG coding circuit.

The MPEG coding circuit 2 blocks the input audio signal $S_{AUD}$ (FIG. 2(B)) by dividing it into data units in synchronism with the block pulse signal SBLK (FIG. 2(A)), and sub-band codes each blocked data to generate the coded data $S_{CODE1}$ (FIG. 2(C)) separated into blocks, as shown in FIGS. 2(A) to (C). The coded data $S_{CODE1}$ is output after a delay corresponding to the time $T_{LG}$ required for coding.

The block pulse signal $S_{BLK}$ is input to a phase comparison circuit 4 together with a frame pulse signal $S_{FLP}$. The frame pulse signal $S_{FLP}$ has a period that allows the video signal frame frequency of 29.97 [Hz] to be in synchronism with the input audio signal $S_{AUD}$ sampling frequency of 48 [kHz], and comprises an array of pulses that rise at a time interval of 1601 T or 1602 T.

Figure 3:
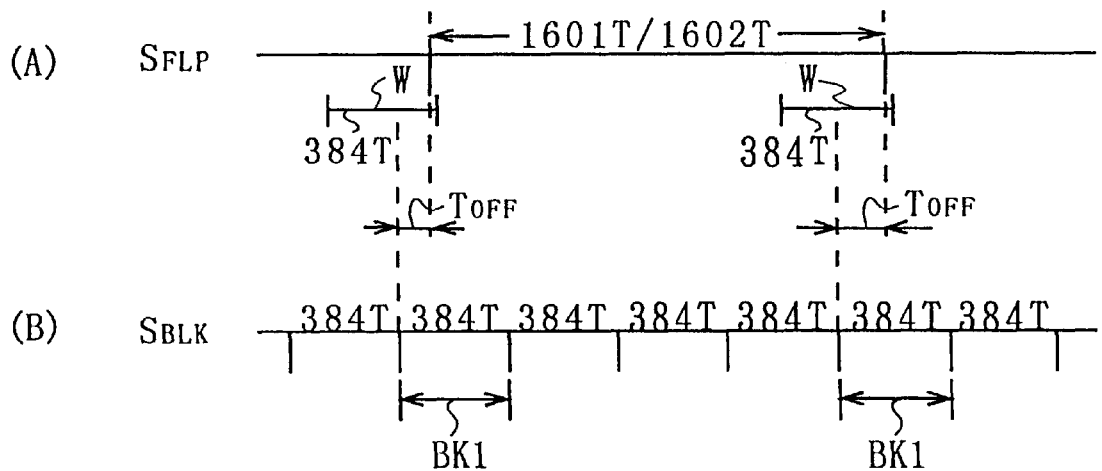
FIGS. 3(A) and (B) are schematic diagrams explaining the operation of a phase comparator.

The phase comparison circuit 4 sets a window period W with a width of 384 T (selected to have a length corresponding to one cycle of the block pulse SBLK) before and after a rising time position of a frame pulse signal $S_{FLP}$ (FIG. 3(A)), and detects a block pulse signal $S_{BLK}$ (FIG. 3(B)) that rises within the window period W to detect the block number and amount of offset $T_{OFF}$ of a leading block BK1, as shown in FIGS. 3(A) and (B).

The phase comparison circuit 4 compares the phases of the block pulse signal SBLK and the frame pulse signal $S_{FLP}$ to detect a coded block located at a boundary between video frames, outputs to the memory circuit 3 a leading block detection signal S2 representing the block number of the detected block, and outputs to an offset addition circuit 5 an offset signal S3 including the amount of offset (a phase difference) of the leading block BK1 from the frame boundary and information on whether or not the leading block BK1 is a duplicate of the preceding coded block.

Thus, by setting the width of the window period W at the period 384 T equal to the block length, one block pulse signal $S_{BLK}$ is ensured to rise within the window period W. The phase comparison circuit 4 can thus output to the memory circuit 3 a leading block detection signal S2 representing the block starting at the block pulse $S_{BLK}$ (FIG. 3(B)) that rises within the window period W.

According to this embodiment, the window period W with a width of 384 T is set from −351 T to +32 T using the rising position of the frame pulse $S_{FLP}$ as the reference.

Figure 4:
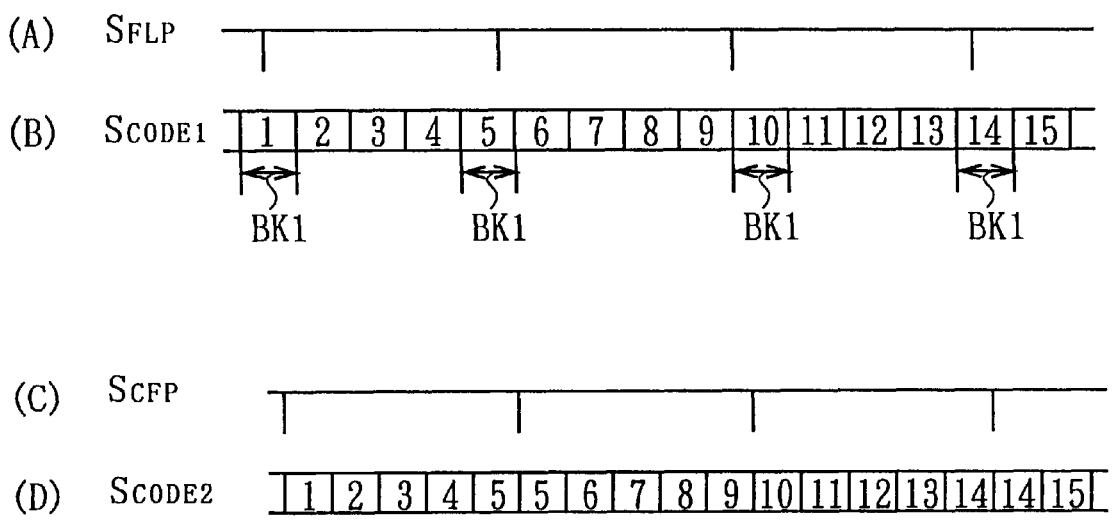
FIGS. 4(A) to (D) are schematic diagram explaining the operation of a memory circuit in the encoder.

The memory circuit 3 sequentially stores input coded data $S_{CODE1}$ (FIG. 4(B)) from the MPEG coding circuit 2 asynchronously with the phase of the frame pulse signal $S_{FLP}$ (FIG. 4(A)), as shown in FIGS. 4(A) to (D). The memory circuit 3 starts reading the leading block BK1 at the rising of a code frame pulse signal $S_{CFP}$ (FIG. 4(C)) and reads coded data $S_{CODE2}$ (FIG. 4(D)) at a high speed sufficient to fill an integral number of coded blocks in one frame in order to output the output coded data $S_{CODE2}$ in synchronism with the code frame pulse signal $S_{CFP}$ (FIG. 4(C)). The code frame pulse signal $S_{CFP}$ indicates the output phase of coded audio data $S_{CODE3}$ output on the basis of frames, and rises at an interval of 1601 T or 1602 T as in the frame pulse signal $S_{FLP}$.

The audio data thus written to the memory circuit 3 as the coded data $S_{CODE1}$ asynchronously with the video frame is read out as the coded data $S_{CODE2}$ synchronizing with the video frame and comprising audio block data including the leading block and an integral number of subsequent blocks (for example, 5 blocks in total) which are filled in one video frame.

According to this embodiment, the memory circuit 3 reads the audio data at a high speed 5/(1601.6/384) times as high as the speed at which the data is written in order to fill five blocks of audio data in one video frame. The value of 1601.6 indicates the number of audio data samples in one video frame, and is the average obtained from generation probability of the numbers of video data samples (that is, 1601 and 1602 samples). In this case, a single read of audio data from the memory circuit 3 may be insufficient to read audio data of as many samples as those in one video frame as output coding data $S_{CODE2}$, so the memory circuit 3 also reads the data in audio blocks corresponding to an insufficient number of samples (in this embodiment, the data in the fifth audio block from leading block BK1) at the terminal of the one video frame period in a duplicate manner.

Whether or not audio blocks are read from the memory circuit 3 in a duplicate manner is determined by the phase comparison circuit 4 detecting whether or not the leading position of the fifth block from the detected leading block BK1 is within the window period W. On determining that the leading position of the fifth block from the leading block BK1 is within the window period W, the phase comparison circuit 4 controls the memory circuit 3 so as to also read the fifth block based on a leading block examination signal S2 in a duplicate manner. When, however, the leading position of the fifth audio block from the leading block BK1 is not within the window period W, a duplicate read is not executed.

An offset addition circuit 5 adds an offset signal S3 to the beginning of each frame (or the beginning of each coded block) as header information to form final coded audio data $S_{CODE3}$, which is transmitted to the recording section of the digital VTR and recorded on the recording medium.

Figure 5:
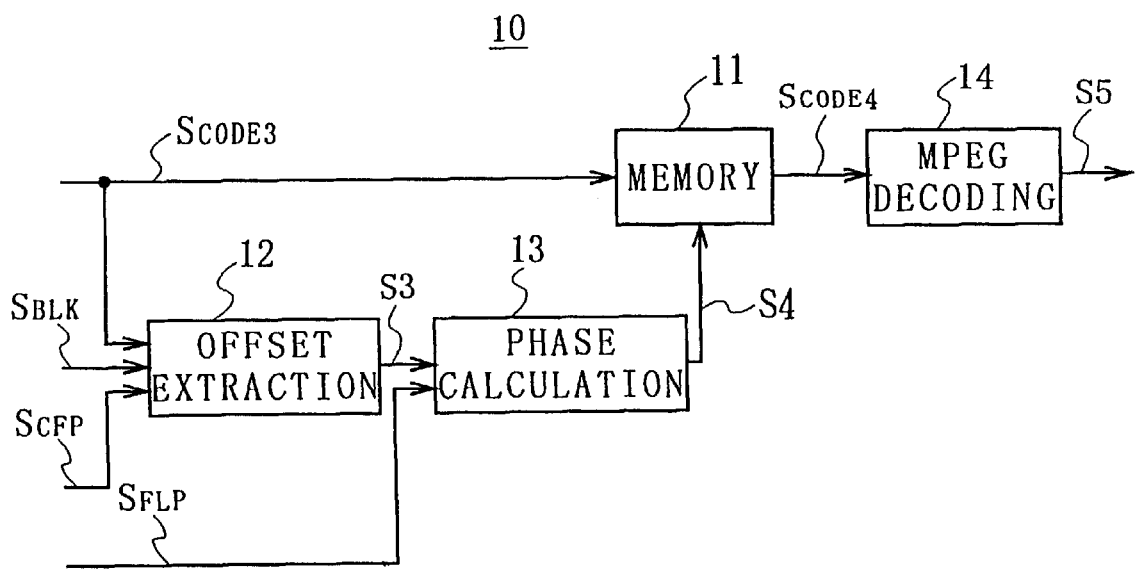
FIG. 5 is a block diagram showing the configuration of an audio signal decoder according to the first embodiment.

The coded audio data $S_{CODE3}$, reproduced from the recording medium by the reproduction section of the digital VTR, is decoded by an audio signal decoder 10 as shown in FIG. 5. The audio signal decoder 10 sequentially stores in the memory circuit 11 the coded audio data $S_{CODE3}$ transmitted from the reproduction section of the digital VTR, and also inputs it to an offset extraction circuit 12.

The offset extraction circuit 12 extracts the offset signal S3 added to the beginning of each frame (or the beginning of each coded block) based on the block pulse signal $S_{BLK}$ or code frame pulse signal $S_{CFP}$, and outputs the offset signal S3 to a phase calculation circuit 13.

The phase calculation circuit 13 receives the offset signal S3 and the frame pulse signal $S_{FLP}$ in synchronism with the frames of the video signals, uses the frame pulse signal $S_{FLP}$ as the reference to calculate a leading block phase signal S4 representing the phase of the leading block, and outputs the signal S4 to the memory circuit 11.

Figure 6:
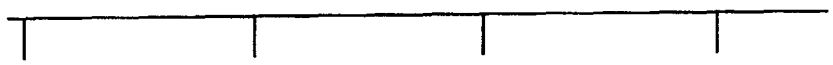
FIGS. 6(A) to (D) are schematic diagrams explaining the operation of a memory circuit in the decoder.
Figure 6:
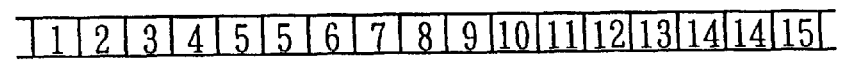
Figure 6:
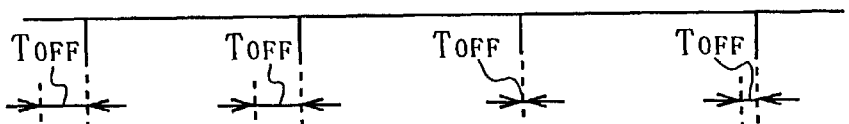
Figure 6:
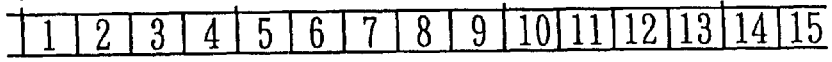

As shown in FIGS. 6(A) to (D), on loading the coded audio data $S_{CODE3}$ (FIG. 6(B)) in synchronism with the code frame pulse signal $S_{CFP}$ (FIG. 6(A)), the memory circuit 11 reads each coded block, which has been offset during coding in synchronism with the frame pulse signal $S_{FLP}$ (FIG. 6(C)), so as to offset it an offset amount $T_{OFF}$ to return it to its original position, based on the leading block phase signal S4 supplied by the phase calculation circuit 13. The memory circuit 11 then outputs the coded block as coded audio data $S_{CODE4}$ (FIG. 6(D)). At this point, only one of the duplicate blocks is read from the memory circuit 11 as the coded block specified by the offset signal, based on duplicate information.

The audio signal decoder 10 enables the obtainment of the coded audio data $S_{CODE4}$ comprising coded block data obtained by recovering, during a read from the memory circuit 11, the original block phases of the coded blocks converted so as to synchronize with the frame pulse signal $S_{FLP}$ by the memory circuit 3 of the audio signal encoder 1. The audio signal decoder 10 uses the MPEG decoding circuit 14 to decode the coded audio data $S_{CODE4}$, delays it a specified amount of time to allow it to synchronize with the video signal, and outputs it as a decoded audio signal S5.

With the above constitution, the input audio signal $S_{AUD}$ sampled at 48 [kHz] is block coded by the MPEG coding circuit 2 of the audio signal encoder 1 every 384 samples according to the MPEG's sound standard MPEG layer I.

The coded blocks are stored in the memory circuit 3, and the timing with which and the speed at which data is read from the memory circuit 3 are controlled so as to fill an integral number of audio blocks in one video frame period, thereby forming the coded data $S_{CODE2}$ in synchronism with the frames of the video signal. The coded audio data $S_{CODE3}$ formed in this manner is directly, on the basis of frames of the video signal, subjected to switching such as edition and then decoded by the audio signal decoder 10.

Thus, the coded audio data $S_{CODE3}$ obtained from the audio signal coding circuit 1 comprises an integral number of coded blocks filled in the period of time corresponding to each video frame, thereby preventing the coded block from extending across video frames. As a result, even if switching is carried out on the basis of frames, each coded block is prevented from being separated at a switching point, and audio data can be decoded without causing decoded data to be missing near the switching point.

Information required to decode each coded block (that is, header, bit allocation, or scale factor information) is added to the beginning of each coded block. Thus, if switching causes this information to be separated from the coded information, no coded information for the coded audio block can be decoded. Consequently, even if the coded audio data $S_{CODE3}$ is subjected to switching on the basis of frames, the audio signal encoder 1 can avoid separating the information required to decode each coded block from the coded information in order to significantly reduce the missing of decoded data compared to the prior art.

After controlling the read from the memory circuit 11 according to the offset signal S3 so as to recover the original phases of the coded blocks which have been offset during coding, the audio signal decoder 10 uses the MPEG decoding circuit 14 to decode the audio data.

If the coded audio data $S_{CODE3}$ is input to the audio signal decoder 10 in the same array as coded by the audio signal encoder 1, offset information, duplicate block information, and audio data can be written to the memory circuit 11 for all the coded audio blocks, and all the block codes are decoded without the missing of data as shown in FIGS. 6(A) to (D).

Figure 7:
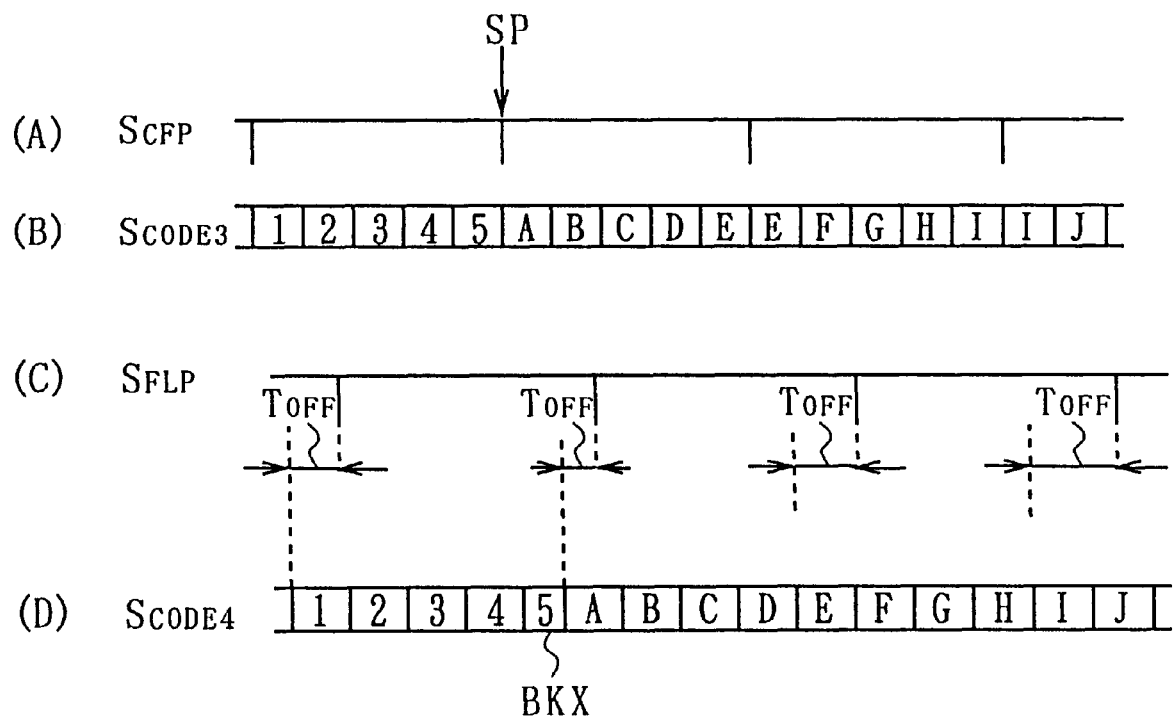
FIGS. 7(A) to (D) are schematic diagram explaining the operation of the memory circuit on coded data that has been subjected to switching on the basis of the frames of a video signal.

As shown in FIGS. 7(A) to (D), however, if editing is carried out in such a way that the block data "1", "2", "3", "4", and "5" will be switched to the block data "A", "B", "C", . . . from the switching point SP, the coded audio data $S_{CODE3}$ (FIG. 7(B)) comprising the audio data "1" to "5" located immediately before the switching point SP followed by the audio data "A" to "D" inserted immediately after the switching point SP is input to the audio signal decoder 10. As a result, offset processing is executed according to the offset information decoded for the audio data "A" to "D", so the leading block "A" of the following audio data "A" to "D" overlaps part of the trailing block "5" of the preceding audio block "1" to "5" (that is, the leading block "A" cannot continuously follow the trailing block "5"). In this case, despite a sufficient amount of information for decoding, the period of time for the trailing block "5" is shorter than 384 T, so the data in the trailing block "5" is partly missing.

The period of time in which data is missing, however, is only 383 T, which means that the missing of data can be substantially reduced compared to the conventional technique in which the entire data in the blocks of 766 samples and relevant 256 samples located before and after these samples cannot be decoded because information cannot be obtained for decoding the audio data.

According to the above configuration, an integral number of coded blocks are filled and transmitted in the period of time corresponding to one frame of the video signal. This prevents the coded audio block from extending beyond a frame boundary in the video signal, and also prevents audio data from being missing during decoding even if switching is carried out on the basis of video frames.

According to this configuration, the phase can be managed more easily during decoding because that amount of the offset of the coded block from a frame boundary which has been used during coding when the phase of the coded block has been aligned with the phase of the frame is added to the coded audio data and because this amount of offset is referenced to recover the original phase relationship during decoding.

(2) Second Embodiment

Figure 1:
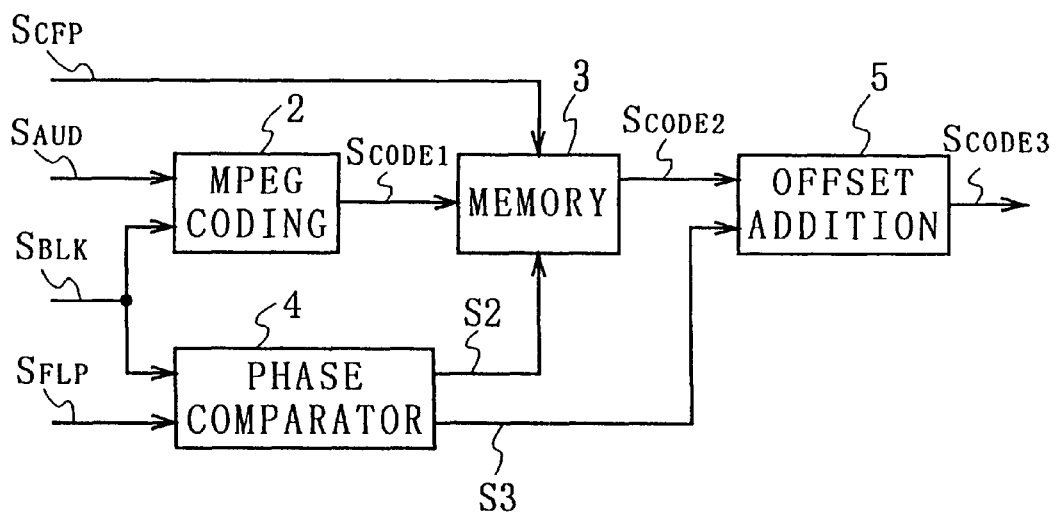
FIG. 1 is a block diagram showing the configuration of an audio signal encoder according to a first embodiment.
Figure 9:
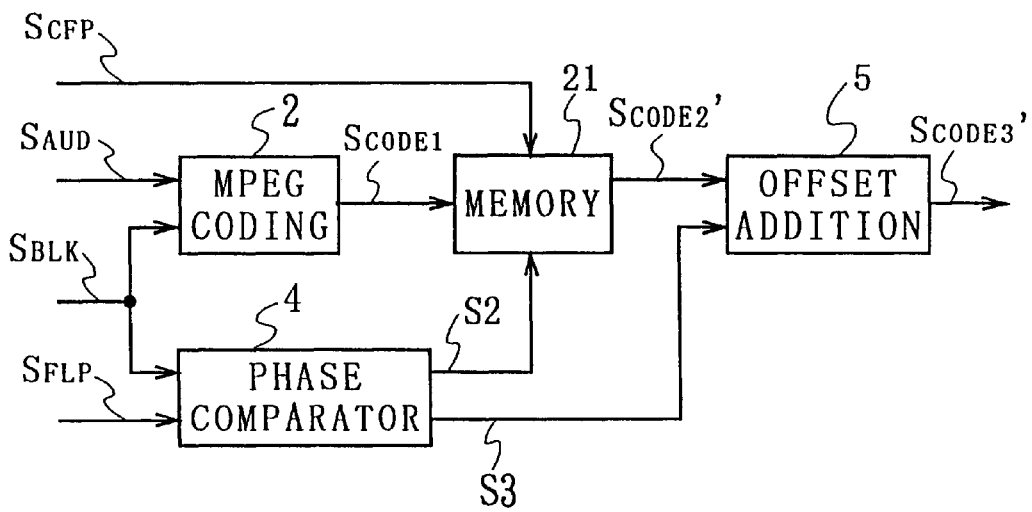
FIG. 9 is a block diagram showing the configuration of an audio signal encoder according to a second embodiment.
Figure 10:
FIGS. 10(A) to (D) are schematic diagram explaining the operation of a memory circuit in the encoder according to the second embodiment.
Figure 10:
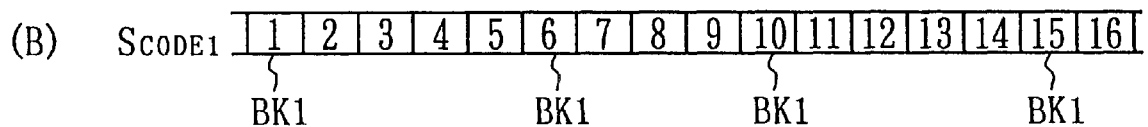
Figure 10:
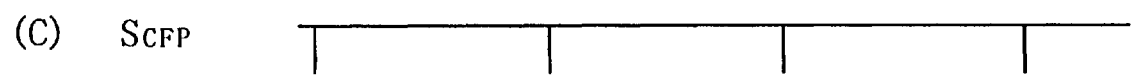
Figure 10:
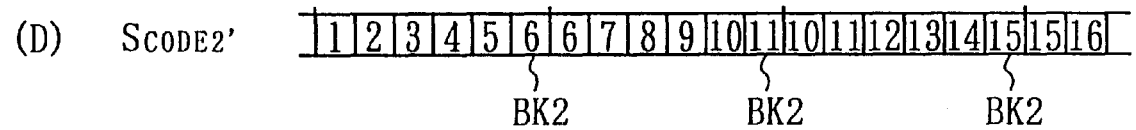

In FIG. 9 in which the same components as in FIG. 1 have the same reference numerals, 20 indicates an audio signal encoder according to a second embodiment. A memory circuit 21 forms coded data $S_{CODE2}'$ comprising coded blocks in synchronism with the frames of the video signal by filling six coded audio blocks in the period of time corresponding to one frame of the video signal, thereby forming the coded data $S_{CODE2}'$, as shown in FIG. 10(D).

As in the first embodiment, the audio signal encoder 20 sets a window period W of a length equal to the width of one coded block including the frame pulse signal $S_{FLP}$, and using as the leading block BK1 the coded block occurring within the window period W to align the audio block boundary position of the leading block BK1 with the corresponding video frame boundary position. The audio signal encoder 20 then arranges the coded blocks in such a manner that six audio blocks including the leading block BK1 are filled in the period of time corresponding to one video frame.

The audio signal encoder 20 also writes the output of the MPEG coding circuit 2 to a memory circuit 21, and reads audio data for six blocks based on the leading block detection signal S2 from the phase comparator 4, as shown in FIGS. 10(A) to (D). In this case, when the fifth audio block from the leading block is within the window period W, it is read in a duplicate manner, whereas when it is not within the window period W, it is not read in a duplicate manner. The sixth block BK2, however, is always read in a duplicate manner.

The audio signal encoder 20 can reliably transmit audio data corresponding to each video block without the missing of data even if transmitted audio data is subjected to switching such as edition on the basis of video blocks.

Figure 11:
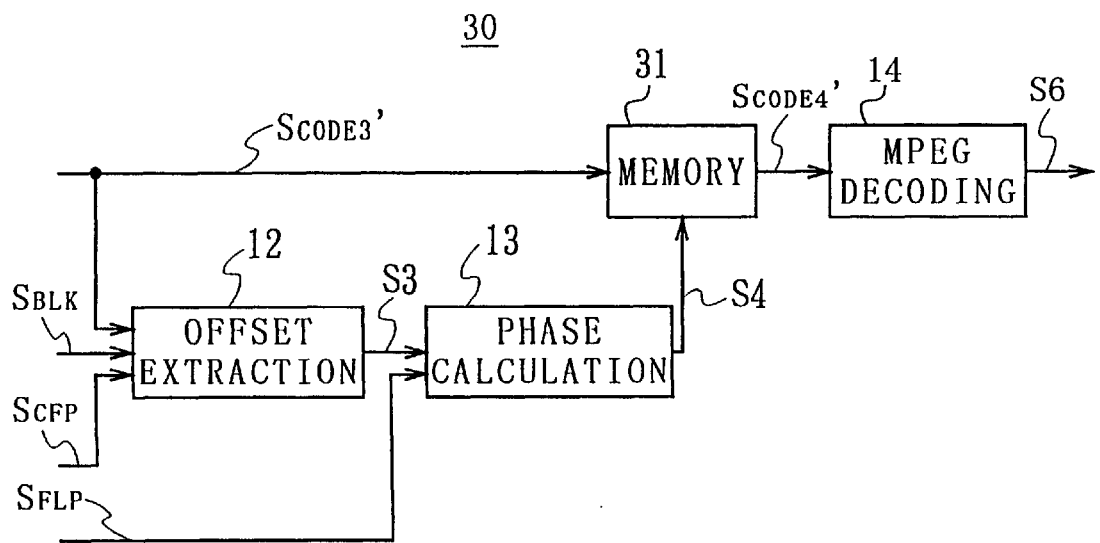
FIG. 11 is a block diagram showing the configuration of an audio signal decoder according to the second embodiment.
Figure 12:
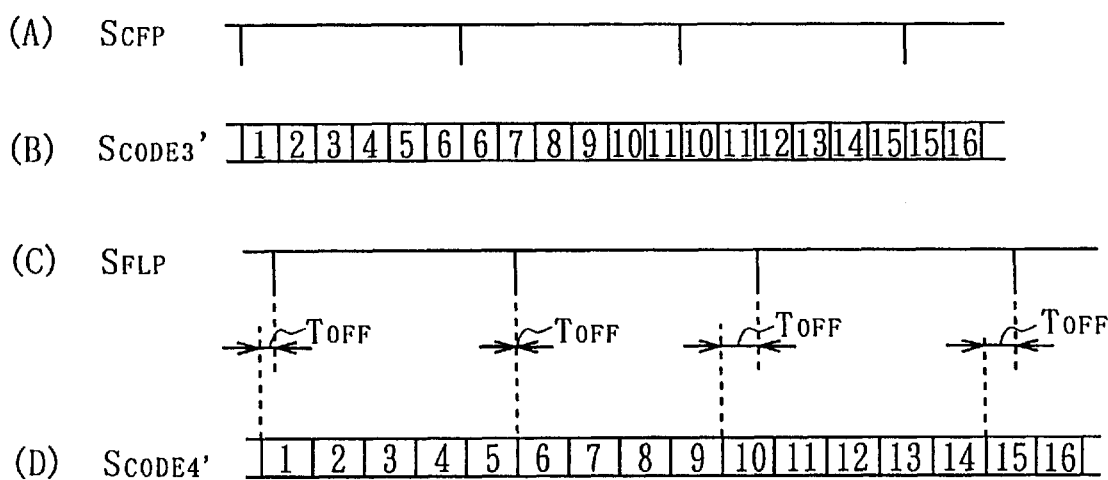
FIGS. 12(A) to (D) are schematic diagram explaining the operation of a memory circuit in the decoder according to the second embodiment.

In FIG. 11 in which the same components as in FIG. 5 have the same reference numerals, 30 indicates an audio signal decoder according to the second embodiment which temporarily stores in a memory circuit 31 coded audio data $S_{CODE3}'$ formed by the audio signal encoder 20, and which controls the read from memory circuit 31 based on the leading block phase signal S4 output from the phase calculation circuit 13 to output from the memory circuit 31 coded audio data $S_{CODE4}'$ with its original phase relationship with the video signal as shown in FIGS. 12(A) to (D).

In FIGS. 12(A) to (D), the coded audio data $S_{CODE3}'$ is input to the audio signal decoder 30 in the same array as coded by the audio signal encoder 20, so the audio data in all the blocks is completely decoded as in the first embodiment.

As shown in FIGS. 13(A) to (D), however, if the coded audio data $S_{CODE3}'$ is input to the audio signal decoder 30 after edition with switching processing at a switching point SP, for offset procedure, the audio data "A" located immediately after the switching point SP overlaps the trailing part of the audio data "10" and "11" located immediately before the switching point SP. Consequently, data read from the memory circuit 31 is not continuous, and incomplete coded blocks result in the preceding data "11" and "10" of output $S_{CODE4}'$.

Figure 13:
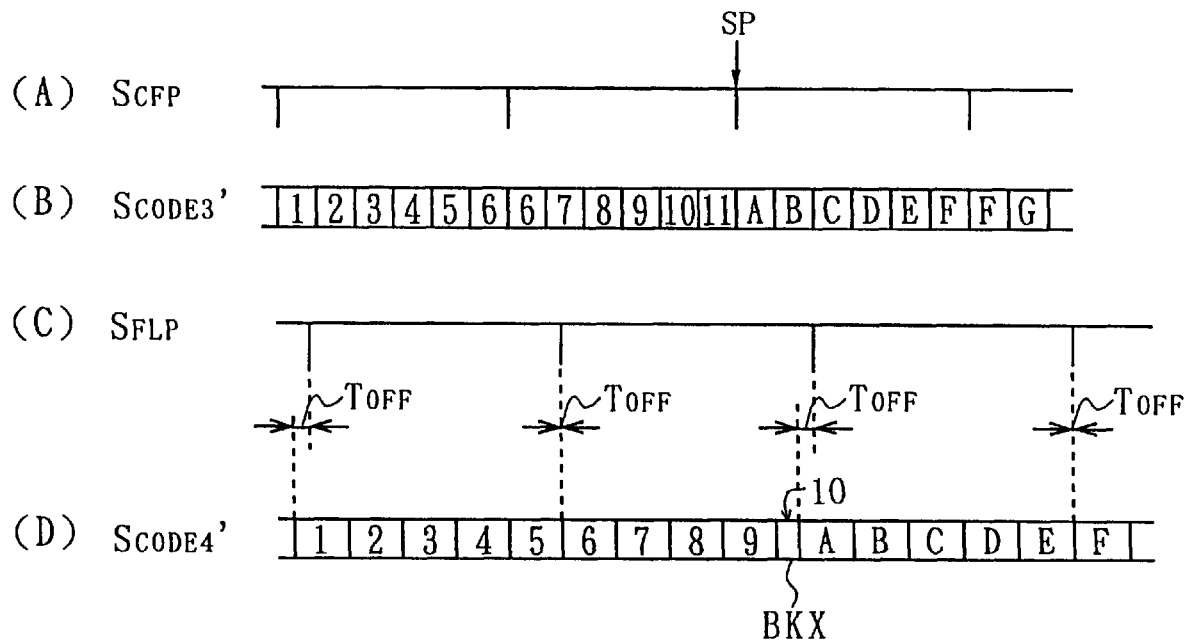
FIGS. 13(A) to (D) are schematic diagram explaining the operation of the memory circuit according to the second embodiment on coded data that has been subjected to switching on the basis of the frames of a video signal.
Figure 14:
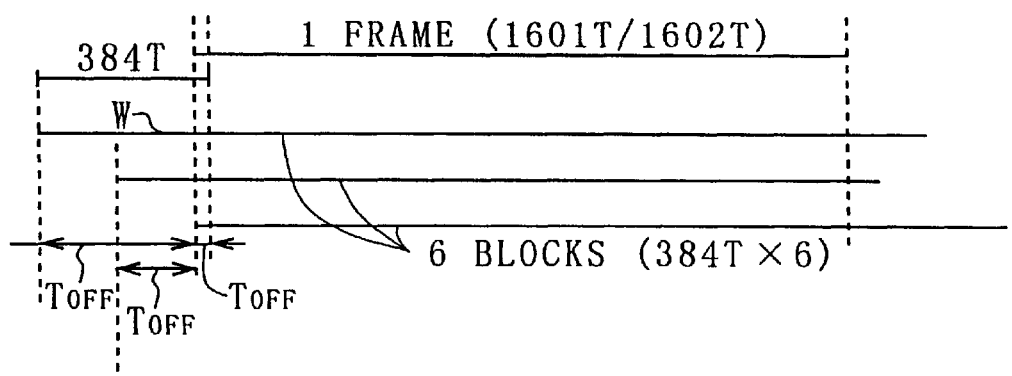
FIG. 14 is a schematic diagram showing how coded blocks filled in one frame overlap original frames according to the second embodiment.

In the coded audio data $S_{CODE3}'$ formed by the audio signal encoder 20, coded blocks each extending beyond a video frame boundary to overlap a plurality of video frames are assigned so as to be filled in the period of time corresponding to one video frame, as shown in FIG. 14. Thus, by providing two audio signal decoders 30 described above, all the coded blocks in the frame can be decoded even if the coded audio data $S_{CODE3}'$ subjected to switching as shown in FIG. 13(B) is received. Even with a single decoder, almost all the coded blocks in the frame can be decoded by enabling all six blocks to be decoded within the period of time corresponding to one video frame of 1601 T or 1602 T.

In this embodiment, six coded blocks are filled in one frame whereas five in the first embodiment. Data is further prevented from being missing during decoding after switching, due to the increased amount of overlapping coded blocks.

With the above configuration, the audio signal encoder 20 fills in one video frame of the video signal six blocks of coded audio data which completely cover each video frame in the period of time corresponding to one video frame in order to form coded audio data $S_{CODE3}'$ in which one or more audio blocks are read in a duplicate manner before and after the code frame pulse $S_{CFP}$.

As a result, even if during insert edition, the audio block data is subjected to switching on the basis of video frames, one of the duplicate audio block data can be decoded to reduce audio blocks that cannot be decoded, thereby enabling reliable decoding.

(3) Other Embodiments (3-1) Although the audio signal encoder 20 according to the above second embodiment fills all six blocks of coded audio data in the period of time corresponding to one video frame, similar effects can be obtained by avoiding the coding of the last part of the sixth block data in the trailing part in the audio data corresponding to each video frame to improve coding efficiency.

According to the MPEG's sound standard MPEG layer I, the total number of bits per block is 3072 at a bit rate of 384 [kbps] and a sampling frequency of 48 [kHz]. These 3072 bits include 32 bits of header information, 128 bits of bit allocation information, a maximum of 192 bits of scale factor information, and the remaining bits of sub-band data in this order.

For the sub-band data, however, the lowpass signal part is recorded first. Since one cannot listen to highpass signals well, highpass signals recorded in the latter part of the bit stream do not significantly affect the sound quality. Thus, according to this embodiment, all the data in the sixth block is not recorded and the data in the latter part of the bit stream is not recorded in the memory circuit 21. That is, the total number of recorded bits may be 1,024 if 352 bits required to record header, bit allocation, and scale factor information as well as, for example, 672 bits of sub-band data are used. The number of bits then becomes one-third of that of the original bit stream, thereby enabling coding efficiency to be improved.

Thus, this embodiment transmits only the former part of the bit stream in the sixth coded block. As a result, during the formation of coded blocks in synchronism with video frames, reduced transmission serves to improve coding efficiency, and the sound quality can be maintained without degradation.

(3-2) Although in the above embodiments, this invention has been described in conjunction with applications to coded data formed on the basis of the MPEG's sound standard MPEG layer I, it is not limited to this aspect but is widely applicable to audio coding methods for forming coded data in blocks. Specifically, effects similar to those of the above embodiments can be obtained by applying this invention when the length of the frame of the video signal is not an integral multiple of the length of the coded block of the audio signal. In addition, by applying this invention to, for example, a coding method that completes both coding and decoding within one block, the audio signal corresponding to each video frame can be almost completely decoded even after its coded data has been subjected to switching.

(3-3) If this invention is applied to a coding method for forming coded blocks of a block length other than 384 T, effects similar to those of the embodiments can be obtained by selecting a range of the window period W which matches the length of the coded block.

Figure 8:
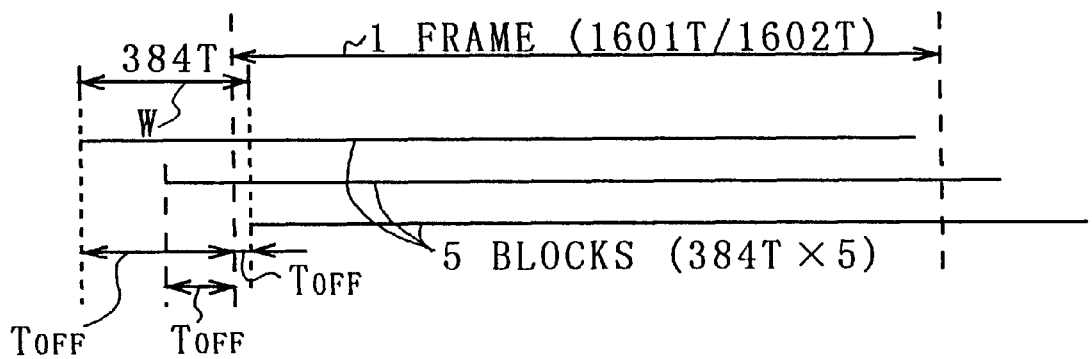
FIG. 8 is a schematic diagram showing how coded blocks filled in one frame overlap original frames according to the first embodiment.

(3-4) According to the first embodiment, in the coded data formed by the audio signal decoder 1, coded block data (384 T×5) of a length extending beyond the boundary between video frames 1601 T or 1602 T in length to overlap a plurality of video frames is assigned so as to be filled in the period of time corresponding to one video frame, as shown in FIG. 8. Thus, by providing two audio signal decoders 10 described above, the period of time in which the coded audio data $S_{CODE3}$ cannot be decoded can be further reduced even if coded data subjected to switching is received as shown in FIGS. 7(A) to (D). Application of sound quality improvement such as cross fading enables decoded audio signals of a much higher sound quality to be obtained.

(3-5) Although the above embodiments have been described in conjunction with the case in which an integral number of coded blocks are filled in the period of time corresponding to one frame of the video signal, similar effects can be obtained by filling an integral number of coded blocks in the period of time corresponding to one field.

(3-6) Although the above embodiments have set the window period W from −351 T to +32 T, this range can be set at different values, for example, from −192 T to +192 T.

Industrial Applicability

This invention is applicable to video signal processing apparatuses that transmit (record, reproduce, and send through a transmission path) video signals and audio signals corresponding to the video signals together.

What is claimed is:

1. An audio signal coding method of coding an input audio signal corresponding to a video signal on the basis of specified data units to form coded audio data separated into coded blocks, comprising the steps of:

blocking and coding said input audio signal in specified data units to form said coded blocks; the coded audio data being sequentially written to a memory so as to form an array of coded blocks; and aligning the leading position of one of said coded blocks with the boundary of a corresponding frame in said video signal, and forming said array of coded blocks in synch with the frames of said video signal by arranging the coded blocks which follow the aligned coded block such that an integral number of said coded blocks are written in the period of time corresponding to one frame of said video signal.

2. The audio signal coding method according to claim 1 wherein information representing the phase difference between said frame or field boundary position and said coded block not subjected to alignment of its block leading position with said frame or field boundary position is added to said coded audio data.

3. The audio signal coding method according to claim 1 wherein:

said video signal has 525 scanning lines per frame and a field frequency of 59.94 [Hz], wherein:
said input audio signal is sampled at 48 [kHz], wherein:
said coded block is obtained by coding said input audio signal on the basis of the data unit of 384 samples, and wherein:
five coded blocks are filled in the period of time corresponding to said one frame or field.

4. The audio signal coding method according to claim 1 wherein:

said video signal has 525 scanning lines per frame and a field frequency of 59.94 [Hz], wherein:
said input audio signal is sampled at 48 [kHz], wherein:
said coded block is obtained by coding said input audio signal on the basis of the data unit of 384 samples, and wherein:
six coded blocks are filled in the period of time corresponding to said one frame or field.

5. The audio signal coding method according to claim 4 wherein for at least one of the coded blocks to be filled in said one frame or field, only part of the bit stream therein is filled.

6. An audio signal encoder for coding an input audio signal corresponding to a video signal on the basis of specified data units to form coded audio data separated into coded blocks, comprising:

coding means for blocking and coding said input audio signal in specified data units to form coded blocks separated into blocks and outputting the coded blocks as audio data;

detection means for determining the phase difference between the frame or field boundaries in said video signal and said coded blocks in said audio data to detect the coded block corresponding to a particular frame or field boundary based on the phase difference; and memory means operative after the write of said audio data from said coding means for aligning, based on the results of detection by said detection means, the block leading position of the coded block with a corresponding frame or field boundary, and outputting an array of coded blocks in synchronism with the frames or fields of the video signal by reading said written audio data to arrange those coded blocks which follow the coded block the leading position of which has been aligned with the corresponding frame or field boundary in such a way that an integral number of coded blocks are filled in the period of time corresponding to one frame or field.

7. The audio signal encoder according to claim 6 including phase difference addition means for adding the phase difference detected by said detection means to said coded block in synchronism with the frame or field which is output from said memory means.

8. The audio signal encoder according to claim 6 wherein:

said video signal has 525 scanning lines per frame and a field frequency of 59.94 [Hz], wherein:
said input audio signal is sampled at 48 [kHz], and wherein:
said coded block is formed by coding said input audio signal on the basis of the data unit of 384 samples.

9. The audio signal encoder according to claim 6 wherein:

said video signal has 525 scanning lines per frame and a field frequency of 59.94 [Hz], wherein:
said input audio signal is sampled at 48 [kHz], wherein:
said coded block is formed by coding said input audio signal on the basis of the data unit of 384 samples, and wherein:
five coded blocks are filled by said memory means in the period of time corresponding to said one frame or field.

10. The audio signal encoder according to claim 6 wherein:

said video signal has 525 scanning lines per frame and a field frequency of 59.94 [Hz], wherein:
said input audio signal is sampled at 48 [kHz], wherein:
said coded block is formed by coding said input audio signal on the basis of the data unit of 384 samples, and wherein:
six coded blocks are filled by said memory means in the period of time corresponding to said one frame or field to be arranged for outputting.

11. The audio signal encoder according to claim 10 wherein for at least one of the coded blocks to be filled in the period of time corresponding to said one frame or field, only part of the bit stream therein is filled.

12. An audio signal coding and decoding method comprising audio signal coding steps including the steps of:
blocking and coding an input audio signal corresponding to a video signal in specified data units to form coded blocks separated into blocks and writing the coded blocks to a first memory means;
aligning the leading position of one of said coded blocks with a corresponding frame or field boundary in said video signal, and forming coded audio data in synchronism with the frames or fields of said video signal by reading data from said first memory means so as to arrange those coded blocks which follow the coded block the leading position of which has been aligned with said frame or field boundary in such a way that an integral number of said coded blocks are filled in the period of time corresponding to one frame or field; and
adding to said coded audio data, information representing the phase difference between the frame or field boundary in said video signal and the coded block not subjected to alignment of the block leading position with the frame or field boundary, and
coded audio data decoding steps including the steps of:
writing said coded audio data to a second memory means;

detecting relevant phase difference information from the coded audio data including said information on the phase difference; and reading data from said second memory means based on the detected phase difference information to recover the original phase relationship between said coded block and said video signal.

13. An audio signal encoder and decoder comprising an audio signal coding section including:

coding means for blocking and coding an input audio signal corresponding to a video signal on the basis of specified data units to form coded blocks separated into blocks and outputting the coded blocks as audio data;

detection means for determining the phase difference between the frame or field boundaries in said video signal and said coded blocks of said audio data to detect the coded block corresponding to a particular frame or field boundary based on the phase difference;

first memory means operative after the write of said audio data from said coding means for aligning, based on the results of detection by said detection means, the block leading position of the coded block with a corresponding frame or field boundary, and outputting an array of coded audio blocks as coded audio data in synchronism with the frames or fields of the video signal by reading said written audio data to arrange those coded blocks which follow the coded block the leading position of which has been aligned with the corresponding frame or field boundary in such a way that an integral number of coded blocks are filled in the period of time corresponding to one frame or field; and phase difference addition means for adding the phase difference detected by said detection means to said coded block in said coded data output from said first memory means which is in synchronism with the frame or field, and a coded audio data decoding section including:

phase difference information detection means for detecting said phase difference information from the coded audio data from said audio signal coding section; and second memory means operative after the write of the coded audio data from said audio signal coding section for reading the written coded audio data based on the phase difference information detected by said phase difference information detection means in order to recover the original phase relationship between said coded block and said video signal.

* * * * *